Dec. 23, 1969     B. O. LUNDH     3,485,294
ARRANGEMENT IN PANEL-TYPE HEATING RADIATORS
Filed Nov. 3, 1967     3 Sheets-Sheet 1
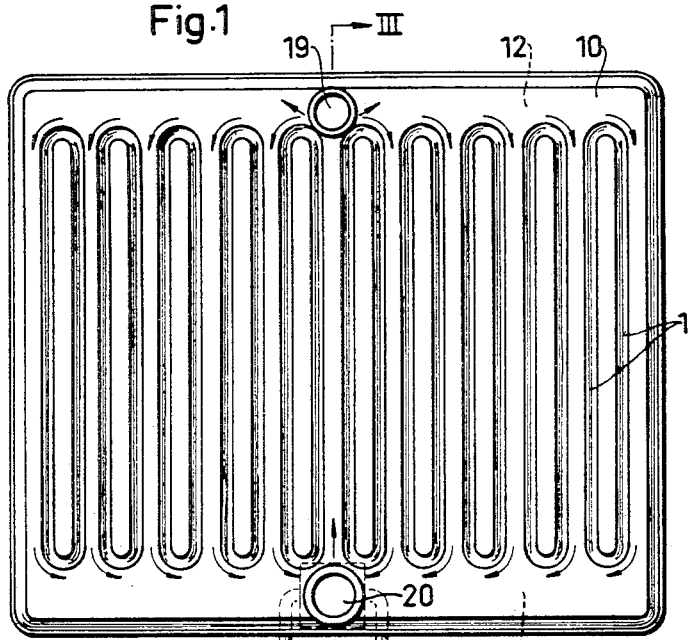
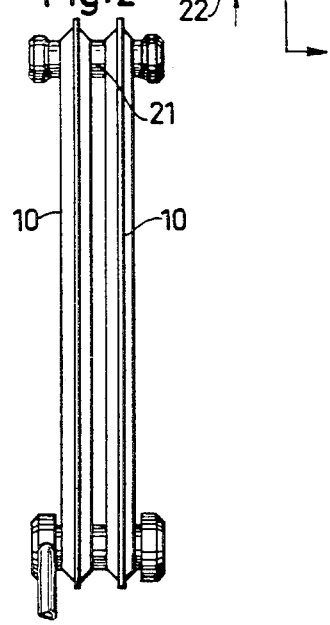
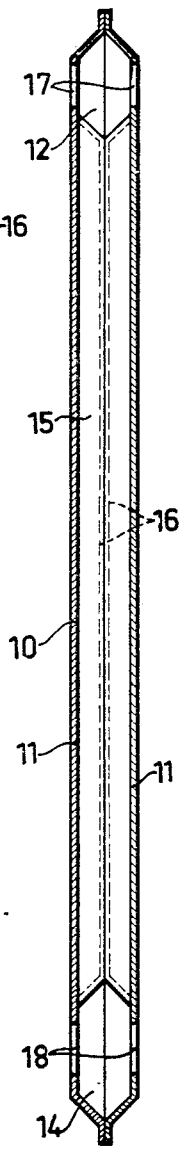

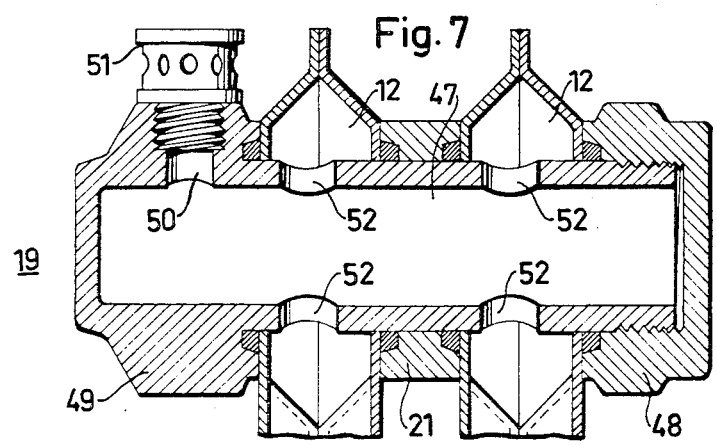
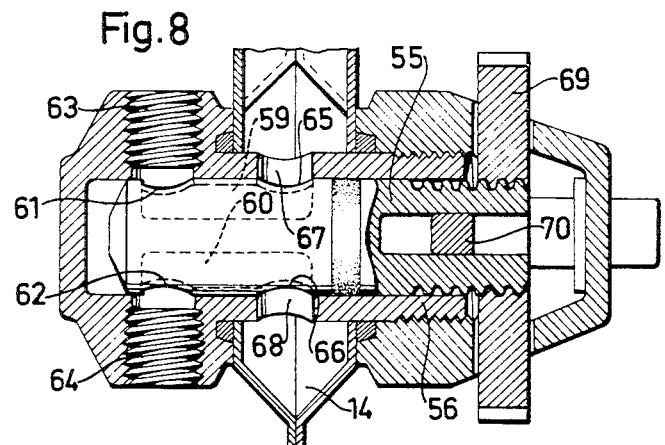
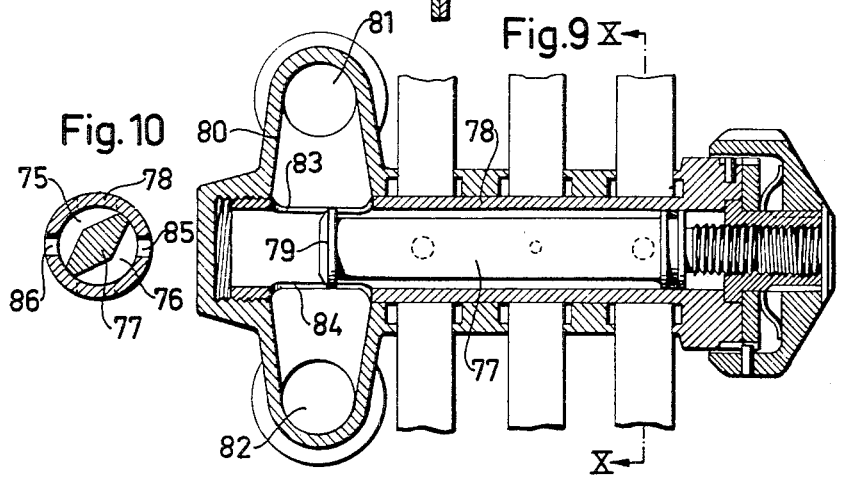

United States Patent Office 3,485,294
Patented Dec. 23, 1969

3,485,294
ARRANGEMENT IN PANEL-TYPE HEATING RADIATORS
Bengt Olov Lundh, Hedemora, Sweden, assignor to Aktiebolaget Hedemora Verkstäder, Hedemora, Sweden, a limited company of Sweden
Filed Nov. 3, 1967, Ser. No. 680,567
Claims priority, application Sweden, Nov. 10, 1966, 15,404/66; Nov. 23, 1966, 16,015/66
Int. Cl. F28f 27/02, 3/14; F24h 3/00
U.S. Cl. 165—103                        9 Claims

ABSTRACT OF THE DISCLOSURE

A radiator panel has upper and lower horizontal collecting passages interconnected by vertical passages. A connecting member is provided for connecting the radiator to a fluid pipe system. The connecting member comprises a threaded bolt having a nut mounted thereon for holding it in sealing and clamping position relative to the panel. The bolt has a plurality of radial openings therein in communication with one of the horizontal passages in the panel and an associated pipe system. An adjustable valve member within the bolt defines longitudinally extending flow passages in communication with said radial openings in the bolt.

---

The present invention relates to heating radiators of the kind having passed therethrough a heating fluid and comprising one or a plurality of panels communicating with each other. Such heating radiators will be referred to hereinafter as "panel-type radiators."

The present invention has for its object to make such structural modifications of conventional panel-type radiators as to enable, in a simple way and from a few standardized panel sizes available, to assemble radiators comprising any number of panels as required to cover the quantity of heat required in any specific application.

A more specific object of the invention resides in the provision of improved means for mechanically interconnecting the panels, such means being designed in a manner to establish communications for the heating fluid between the various panels.

A still more specific object of the invention resides in designing said interconnecting means in such a way as to incorporate therein the required connections to the supply-pipe system and/or any required valves, such as a control valve or a ventilating valve.

The invention will now be described more in detail with reference to the accompanying drawings, in which:

FIGURE 1 is a front-elevational view of a panel-type radiator having connecting elements constructed in accordance with the invention;

FIGURE 2 is a side-elevational view of the radiator shown in FIGURE 1;

Figure 4:
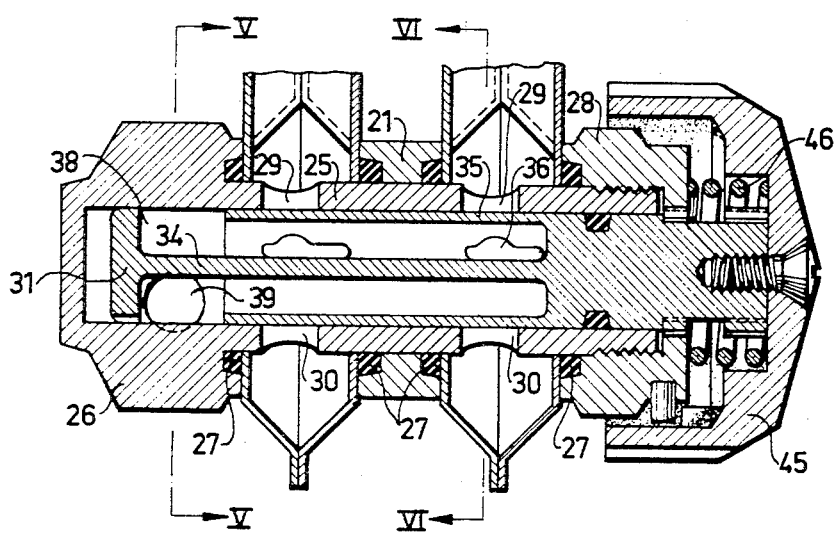
Figure 5:
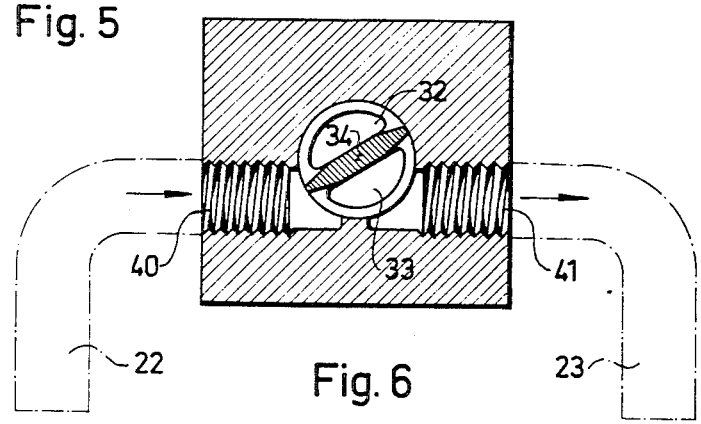

FIGURE 3, on a larger scale, shows a vertical cross section along the line III—III through a panel of the type forming part of the radiator according to FIGURES 1 and 2;

FIGURE 4 is a vertical longitudinal section through a connecting element disposed in the lower water collecting passage and designed as a combined connecting element and control valve;

FIGURE 5 shows a cross section along the line V—V in FIGURE 4; and

Figure 6:
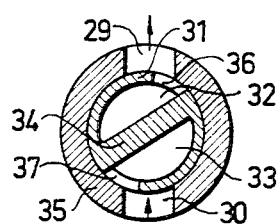

FIGURE 6 shows a cross section along the line VI—VI in FIGURE 4, its valve member being shown rotated through 30°;

FIGURE 7 shows a longitudinal section through a connecting device to be inserted through the upper water collecting passage and designed as a ventilating valve;

FIGURE 8 shows in cross section an alternative design of a connecting device which is arranged as a combined connecting element and control valve, being disposed in the bottom portion of a single-panel radiator;

FIGURE 9 is a horizontal longitudinal section through a further modified form of connecting device serving also as a control valve; and FIGURE 10 is a section taken along the line X—X in FIGURE 9.

The radiator shown in FIGURES 1 to 7 is assembled from two identical radiator panels 10. Each panel is composed of two image-reversed panel halves 11 each consisting of a rectangular sheet-metal plate formed into the shape shown by stamping or in any suitable other way. Along their mating peripheral edges, the plates are welded together by a continuous seam weld so as to establish a water-tight joint. The shaped profiles terminate in spaced relation to the top and bottom edges, respectively, of each plate so as to form, when the plates are united, upper and lower water collecting passages 12 and 14, respectively. Opening into these two water collecting passages are vertically extending flow passageways 15 formed between the mating bottom portions 16 of the channels formed in the course of the shaping operation. Said bottom portions 16 are welded together by spot welding whereby a rigid structure is obtained.

As shown, each water collecting passages 12 and 14, respectively, is defined by flat plate portions parallel to the main plane of the panel. Formed in these portions are aligned openings 17 and 18, respectively, for accommodating connecting elements 19 and 20, respectively, having bores through which the collecting passages of the various panels communicate with each other. The openings 17 and 18 are disposed directly above and below, respectively, the central vertical flow passageway 15 of each panel concerned. Between adjacent panels annular spacers 21 are slipped over the connecting elements and adapted to sealingly abut the flat plate portions bounding the collecting passages. The lower connecting element 20 is assumed to be designed as a combined pipe connection and control valve, while the upper connecting element 19 is taken to be designed as a ventilating valve. The inlet and outlet pipes for the heating fluid are designated 22 and 23, respectively.

FIGURES 4 to 6 illustrate a preferred embodiment of a lower connecting element 20. The mechanical interconnection of the panels is constituted by a tubular bolt 25 having a head 26 formed at one end thereof. This head is formed in its face engaging the panel with an annular groove accommodating a resilient sealing ring 27. The bolt is formed at its other end with an externally screw-threaded shank portion onto which a nut-like end socket 28, also provided with a sealing ring 27, is screwed. Between the panels, an annular spacer 21 is slipped over the tubular bolt. The annular spacers 21 have formed in both end faces thereof annular grooves accommodating resilient sealing rings 27. The bore of the bolt 25 communicates with the lower collecting passages of the panels through radial openings, namely inlet openings 29 disposed in its upper wall portion and outlet openings 30 disposed in its lower wall portion.

Inserted in the axially extending bore of bolt 25 is a cylindrical valve member 31 having formed in it two longitudinally extending passageways 32 and 33 separated from each other by a diametrically disposed partition 34. The cylindrical skirt 35 defining these passageways has formed therein diametrically opposite apertures 36 and 37 disposed in the same diametrical planes as the respective pairs of lateral openings of the bolt wall. Interiorly of the bolt head, the valve member is formed with large communication openings 38 and 39 cut out in said cylindrical skirt. Opening into the bore of the connecting bolt at the same diametrical plane as the openings 38 and 39 are two axially aligned screw-threaded holes 40 and 41 serving for connecting the pipes 22 and 23 for the entrance and exit, respectively, of the heating fluid. As will be seen from FIGURE 5, in the present embodiment the screw-threaded holes are disposed beneath the partition 34 when this partition is in its horizontal position, although the holes, of course, could instead be disposed at the same axial plane as the valve member 31.

For manually adjusting the valve member angularly a control knob 45 is provided which is biased by a compression coil spring 46 urging the knob towards its normal, or inactive, position, as shown. In this position, a row of gear teeth projecting inwardly from the knob are engaged by complementary teeth projecting outwardly from the nut 28 thereby preventing rotation of the knob in its normal position. Upon depressing the knob while compressing the spring 46, the complementary gear teeth will be moved out of mesh, thereby enabling the knob to be turned, as desired. The spring 46 is so dimensioned that a small child cannot depress the knob, this being an essential feature since the control valve is to be disposed near the floor.

As shown in FIGURE 7, the upper connecting element 19 comprises a tubular bolt 47 having a head 49 at one end thereof and carrying a nut 48 at its screw-threaded opposite end. Between the two panels an annular spacer, or spacer ring, 21 is slipped over the bolt and disposed in sealing engagement with the opposed panel surfaces. The axially extending bore of the bolt is continued into the bolt head 49. Formed in the bolt head is radially upwardly extending vent passage 50 which is normally closed off by a vent screw 51. In alignment with the upper collecting passages 12 of the respective panels communication openings 52 are formed in the bolt shank.

The arrangement described functions as follows.

When the control valve 20 is occupying an intermediate position as shown in FIGURES 5 and 6 of the drawings, the flow of heating fluid entering through pipe 22 will become split into two branch streams, one of which will proceed directly into pipe 23 whereas the other stream will flow into the horizontally extending communication passageway 32 within the valve member and will leave this passageway through the relatively partially overlapping openings 36 and 29 of the valve member and connecting bolt, respectively, the flowing upward through the centrally disposed flow passageway 15 and into the upper horizontal collecting passage 12, then to the left and to the right along this passage, and then—while getting cooled—down the remaining vertical flow passageways and into the lower collecting passage 14, flowing to the middle of this passage and then passing through the relatively partially overlapping openings 30 and 37 of the tubular connecting bolt and valve member, respectively, to the outlet 41 at which this fluid stream merges into the fluid stream coming directly from pipe 22, to leave the assembly together with the latter stream through pipe 23. The control valve functions in the manner of a shunt- or by-pass valve the angular setting of which determines the proportion of the incoming flow of heating fluid to be recirculated through the radiator assembly. Upon turning the valve member into an angular position at which the partition 34 is horizontally disposed, the entrance and exit of the radiator will both become shut off, and at the same time a completely unobstructed flow path will be established for the heating fluid between pipes 22 and 23. Conversely, when turning the control valve into a position in which the partition 34 is in a vertical plane, then the direct communication between pipes 22 and 23 will be shut off completely whereby the entire flow of heating fluid is compelled to flow through the radiator.

Obviously, any number of panels can be interconnected into a radiator assembly by the use of connecting elements identical to the elements 19 and 20. If it is desired to change the number of panels of a radiator which has already been thus assembled, for instance by changing the number of panels from two to three, then all that is required is to replace the connecting elements 19 and 20 by connecting elements of increased length and having greater number of openings for communication with the respective panels thus added. The supply and discharge pipes 22 and 23, respectively, for the heating fluid will be disposed at the same locality, for instance at the centre of a window recess, irrespective of the number of panels comprised in the radiator assembly to be connected to said pipes. The system enables the number of different panel sizes to be reduced—oftentimes no more than two sizes will be required—while the varying heating requirements will be met by assembling each radiator from the number of panels required to cover the actual requirement.

The connecting elements need only be manufactured in a limited number of designs, namely, one design for each number of panels expected to come into question in practice. The assembly of the panels may be made either by the manufacturer, by the wholesaler, or even at the site of installation. The cost of manufacturing as well as the cost of installation will be essentially reduced.

FIGURE 8 shows a modified form of a connecting element having a built-in control valve, in which the valve member is arranged to be adjusted by being moved axially. As seen in this figure, the connecting element is dimensioned and designed for connection to a single-panel radiator. Its cylindrical valve member 55 is axially displaceable but nonrotatable within the tubular connecting bolt 56. Formed in the valve member are upper and lower passageways 59 and 60, respectively. These passageways at both ends are bounded by unitary cylindrical portions or lands. Formed in the cylindrical wall surrounding the passageways are upper and lower openings 61 and 62, respectively, disposed in a diametrical plane coincident with the plane in which the inlet and outlet openings 63 and 64, respectively, for the heating fluid are disposed. Also formed in the cylindrical wall are upper and lower openings 65 and 66, respectively, which, in the position of the valve member here shown, are in alignment with upper and lower openings 67 and 68, respectively, formed in the wall of the bolt 55 and opening into the lower collecting passage 14 of the radiator panel. Axial adjustment of the valve member is effected by means of a nut-like control knob 69 which is screwed onto the threaded end portion of the valve member and is rotatable but axially non-displaceable relative to the bolt. A pin 70 engaging an axially extending groove in the valve member prevents any angular movement of the latter. The knob 69 preferably is normally secured against rotation by locking means of any suitable kind which must be actuated to enable the knob to be rotated. Such locking means should be so designed that a small child cannot release the same.

Obviously, in the position of the valve member 55 here shown, the direct communication between the pipe sockets 63 and 64 is shut off so that the whole amount of heating fluid is compelled to flow through the radiator. By moving the valve member to the right, an increasing proportion of the incoming flow of heating fluid will pass directly to the exit socket 64. This shunt or by-pass action will be amplified by the simultaneous action of reducing the effective flow areas of the openings communicating the passageways within the valve member with the lower collecting passage of the radiator. In a multi-panel radiator, the proper distribution of heating fluid to the various panels may be effected by suitably dimensioning the openings 65 and 66.

The combined connecting and valve device of FIGURES 9 and 10 distinguishes from that of FIGURE 8 in that, inter alia, the upper and lower communication passageways 75 and 76, respectively, are bounded outwardly by the cylindrical wall of the tubular bolt 78. The free inner end of the valve member is formed as a circular disc or land 79 of a diameter to make a sliding fit with the bore of the bolt. The bolt 78 is screwed into the bottom portion of a closed cap 80 which, through openings 81 and 82, communicates with the inlet and outlet pipes 22 and 23, respectively, for the heating fluid. The bore of the tubular bolt 78, in the position of the valve member here shown, communicates with the interior of the cap 80 through two diametrically opposite openings 83 and 84. Formed in the cylindrical wall of the tubular bolt in alignment with the lower collecting passages 14 of the respective radiator panels are an upper and a lower opening 85 and 86, respectively. The relative sizes of the openings 85 and 86 are so chosen as to ensure optimum distribution of the heating fluid to the various panels. The position of displacement of the valve member 77, as will be seen immediately from FIGURE 9, will determine the ratio of the rate of flow of heating fluid circulated through the radiator to the rate of flow of heating fluid flowing through the cap 80 from the pipe 22 or opening 81, respectively, to the opening 82 or pipe 23, respectively.

In each of the embodiments of connecting elements including a control valve, as shown in the accompanying drawings, these devices are designed for connection into a single-pipe system. It is seen, however, that the valves may be modified for connection into a double-pipe system simply by modifying the valve member so as to prevent any by-pass or shunting of heating fluid, i.e. any direct passage thereof from entrance to exit.

Further modifications are conceivable without departing from the scope of the invention.

What I claim is:

1. In combination, a radiator panel having opposite spaced walls defining therebetween upper and lower horizontal collecting passages and a plurality of vertical passages in communication with and extending between said horizontal passages, said walls having opposite facing openings in communication with one of said horizontal passages, a connecting member for connecting the radiator to a fluid pipe system, the connecting member comprising a bolt extending through said openings and having threads thereon, a nut threadedly mounted on said bolt for sealing and clamping said bolt in place relative to said walls, said bolt having a plurality of substantially radial openings therein and being in communication with said one horizontal passage, said radial openings including at least one supply opening in the upper part of said bolt and at least one outlet opening in the lower part of said bolt, and means defining within said bolt an upper and a lower longitudinally extending flow passage, said upper flow passage being in communication with said one supply opening for supplying fluid to said panel, said lower flow passage being in communication with said one outlet passage for removing fluid from said panel.

2. Apparatus as defined in claim 1 wherein said bolt is tubular, and a valve body being provided within said bolt, said valve body having passages therein defining said upper and lower flow passages.

3. Apparatus as defined in claim 2 wherein said valve body is shiftable and so shaped as to enable the amount of fluid supplied to the radiator per unit of time to be regulated by shifting of the valve body.

4. Apparatus as defined in claim 3 wherein the valve body is shaped to effect shunting through the panel of heating fluid supplied through a single pipe system.

5. Apparatus as defined in claim 3 wherein the valve body is rotatable within said bolt.

6. Apparatus as defined in claim 3 wherein the valve body is axially displaceable within said bolt.

7. Apparatus as defined in claim 3 including spring loaded locking mechanism for normally locking said valve body against shifting.

8. Apparatus as defined in claim 1 including an additional bolt supported by said panel, said additional bolt having a single axial passage therethrough, said additional bolt having openings therein providing communication between said single axial passage and the other of said horizontal passages in the panel.

9. Apparatus as defined in claim 8 including a ventilating valve supported by said additional bolt, said ventilating valve being in communication with said single axial passage formed in the additional bolt.

References Cited

UNITED STATES PATENTS 773,388   10/1904   Gerken _____ 237—70 X

FOREIGN PATENTS 193,607   3/1923   Great Britain.
285,524   2/1928   Great Britain.
 61,325  12/1938   Norway.
165,748  12/1933   Switzerland.

ROBERT A. O'LEARY, Primary Examiner

A. W. DAVIS, Assistant Examiner

U.S. Cl. X.R.

165—130, 170; 237—70, 72, 74